US005453145A

United States Patent [19]

Beaman et al.

[11] Patent Number: 5,453,145

[45] Date of Patent: Sep. 26, 1995

[54] Z-AXIS DIMENSIONAL CONTROL IN MANUFACTURING AN LED PRINTHEAD

[75] Inventors: Bryan A. Beaman, Churchville; Richard N. Capobianco, Rochester, both of N.Y.

[73] Assignee: Eastman Kodak Company, Rochester, N.Y.

[21] Appl. No.: 663,341

[22] Filed: Mar. 4, 1991

[51] Int. Cl.$^6$ .............................. B32B 31/00; G01D 9/42

[52] U.S. Cl. .......................... 156/230; 156/299; 156/556; 156/560; 347/238

[58] Field of Search ................................ 346/107 R, 1.1, 346/110 V, 139 R; 357/17, 45; 313/500; 362/800; 414/774, 782, 752, 749; 156/230, 241, 249, 539, 556, 560, 299

[56] References Cited

U.S. PATENT DOCUMENTS

| | | | |
|---|---|---|---|
| 3,666,588 | 5/1972 | Wanesky | 156/249 |
| 3,771,871 | 11/1973 | Rattman | 355/102 |
| 3,969,173 | 7/1976 | Amberg et al. | 156/218 |
| 4,280,786 | 7/1981 | Dyche | 414/749 |
| 4,942,405 | 7/1990 | Dody et al. | 346/107 R |
| 4,999,077 | 3/1991 | Drake et al. | 156/241 X |

FOREIGN PATENT DOCUMENTS

WO89/08927 9/1989 WIPO .

*Primary Examiner*—Benjamin R. Fuller
*Assistant Examiner*—David Yockey
*Attorney, Agent, or Firm*—Norman Rushefsky

[57] ABSTRACT

LED dice and driver chips for generating current for driving LED's are to be mounted on tile modules. Z-axis dimensional control of the LED dice and driver chips is provided by placement of the dice and driver chips face down in a first fixture member to locate the dice against a first datum on the fixture. A front face of the tile is accurately positioned in the x, y plane relative to the dice and driver chips and supported in a second fixture member. The front face of the tile contains adhesive for attachment of the tile to the LED dice and driver chips. The rear face of the tile is located against a second datum in the fixture that is located a fixed distance from the first datum. Thus, the adhesive between the dice and the front face of the tile compensates for the thickness variations of both the dice and the tile.

15 Claims, 2 Drawing Sheets

Z-AXIS DIMENSIONAL CONTROL IN MANUFACTURING AN LED PRINTHEAD

CROSS REFERENCE TO RELATED APPLICATION

This application is related to U.S. application Ser. No. 07/663,489 filed concurrently herewith in the names of Bryan Beaman et al and entitled "Leaf-Spring Assembly For LED Printhead", and now U.S. Pat. No. 5,079,567.

BACKGROUND OF THE INVENTION

1. Field of the Invention

An improved method and apparatus used in the manufacture of an LED (light-emitting diode) printhead or the like is described, and more particularly the invention is directed to an improved method and apparatus for assembling LED dice or other recording elements to a tile module to provide improved Z-axis dimensional control.

2. Brief Description of the Prior Art

In the prior art as described in U.S. Pat. No. 4,942,405 LED dice and silicon driver chips therefor are assembled upon a metallic tile to form a testable module. After testing of the module, the modules are assembled upon a motherboard to form an LED printhead having a single row of several thousand LED's that may be used for recording as a non-impact printer. Typically, a lens such as a Selfoc lens (trademark of Nippon Glass Co. Ltd.) will be mounted to the printhead to focus light from the LED's onto a recording photoreceptor such as a photoconductive drum or web or other photosensitive surface such as photographic film.

As noted in the referenced patent, precision tolerances must be maintained in assembling the printhead and in forming the various components. In describing the invention disclosed herein, nomenclature set forth in the referenced patent will be employed. Thus, the face of the LED die on which the LED's are formed is referred to as the front and the opposite face as the back. A similar definition is used for the other parts of the assembly such as integrated circuit driver chips, mounting tiles and the like except that in each case, the face facing in the same direction as the LED's is referred to as the front.

Thus, a coordinate system is defined as having an x-direction along the line of LED's. A y-direction is defined as being in the plane of the LED's perpendicular to the x-direction. The z-direction is defined as being normal to this plane and is the direction in which the light output from the LED's is generally directed and may be thought of as the height direction of the LED's. Z-axis height control is important since the typical Selfoc lenses used have an associated depth of field, and uniform z-height control is required in order to stay within the field so as to minimize the pixel size variation of the transmitted image.

In the embodiments described for manufacturing of LED printheads disclosed in the referenced patent, there are basically described two approaches for Z-axis dimensional control. In a first approach, three LED dice are assembled onto a tile in a sub-assembly fixture where x and y-dimensional control is maintained but no z-axis control is provided. Thereafter, the tile with LED dice and driver chips adhesively attached thereto are mounted to a motherboard and z-axis control provided by supporting the front faces of all the tiles upon rails so that these front faces are accurately located while adhesive between the motherboard and the backs of the tiles accommodates the differences in dimension in the z-axis direction between the various tiles. A problem with this approach is that z-axis control of the gallium arsenide LED's is indefinite since the only known surface is the front face of the tile. A further problem with this approach is that a portion of the front of the tile must be left clear up to at least the assembly step of mounting the tiles to the motherboard. In addition to supporting the LED dice and driver chips for driving the LED's, the tile may also support a printed circuit board or spreader board for distributing electrical signals along the length of the printhead to the driver chips and wiring for connecting the various components.

In a second approach described in this patent, a sub-assembly fixture for mounting LED dice and driver chips to a tile employs recesses or pockets into which the LED dice and driver chips are placed. The front face of the LED dice engage a bottom surface of the pocket which is accurately spaced from the rails or reference faces formed on the sub-assembly fixture. A screen-printed adhesive is coated on the tile and the tile is supported on the rails over the LED dice and driver chips for adhesive bonding. Thus, the adhesive between the tile and LED dice accommodates variations in height of the components in the subassembly fixture. This approach still retains the problem of using some space on the front face of each tile during forming of the modules. Presumably, the modules will be assembled on the motherboard using the front face of the tile as a reference or datum and therefore clearance must be provided on the front face of the tile during this later assembly operation as well. This is undesirable since space on the tile is limited due to the area thereof occupied by the various components.

SUMMARY OF THE INVENTION

It is, therefore, an object of the invention to overcome the above-noted problems of the prior art. These and other objects are accomplished by an assembly process and apparatus which establishes the back surface of a tile as one reference and the front surface of the LED or recording element component as the second reference with a controlled dimension therebetween. The use of the tile's back surface as a reference allows as much of the front surface as is available for mounting the necessary components.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF THE PREFERRED EMBODIMENTS

Figure 1:
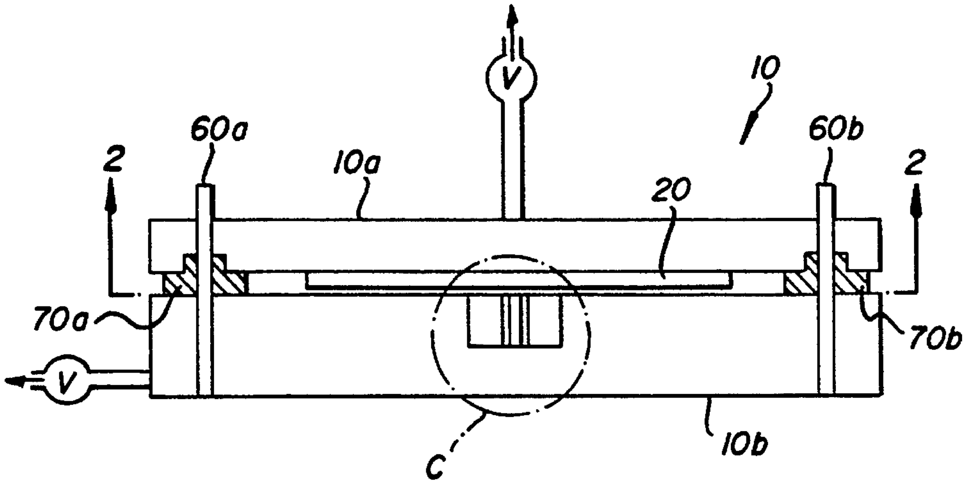
FIG. 1 is a cross-sectional view of a sub-assembly for mounting LED dice and integrated circuit driver chips to a tile.

Because apparatus of the type described herein are well known, the present description will be directed in particular to elements forming part of or cooperating more directly with the present invention.

With reference now to the drawings, a sub-assembly fixture 10 is illustrated for assembling LED dice and driver chips to a metallic or heat-conductive tile 20. Tiles such as of ceramic, aluminum oxide or aluminum nitride with thick and/or thin films on it also may be used. Typically, a tile module for mounting on an LED printhead will have a series of gallium arsenide or gallium aluminum arsenide LED dice 30*a*, 30*b*, 30*c* mounted end to end to form a row of such dice on a central axis of the front face of the tile. To each side of the row of dice, there will be provided a corresponding number of integrated circuit driver chips 40*a*, b, c and 42*a*, b, c so that two driver chips are associated with each LED die. Typically, an LED die may have say 128 LED's arranged in say a row so that each driver chip drives 64 of the LED's formed within a corresponding die. Also, typically, the silicon driver chips each have 64 channels, i.e. current-generating circuits that may provide regulated driving currents to respective LED'S that are selected to be activated. Printed circuit or spreader boards not shown in the figures may be mounted to the front face of the tile either prior to, during or subsequent to the sub-assembly step to be described below to provide a means for distribution of electrical signals such as data, power and clock signals to the driver chips. A specific spreader board that is preferred is described in U.S. application Ser. No. 07/455,125, filed Dec. 22, 1989. The spreader boards will be located on the tile to the outboard side of each row of driver chips.

Figure 2:
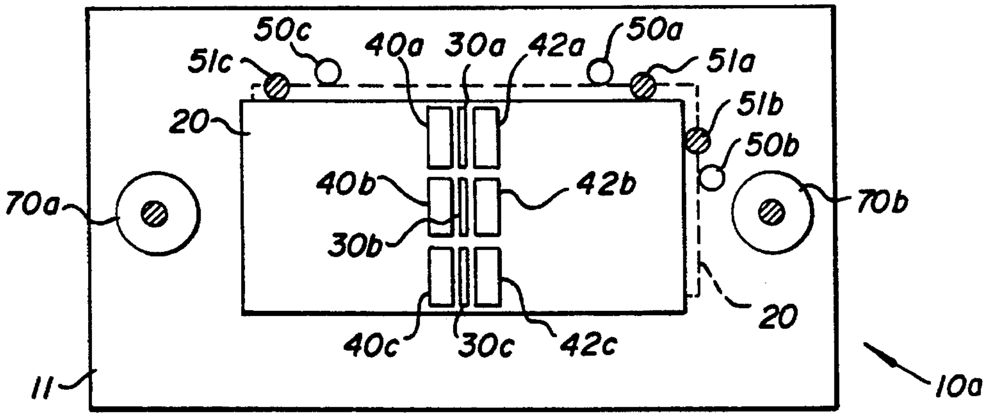
FIG. 2 is a view along the lines 2—2 of the sub-assembly of FIG. 1.
Figure 3:
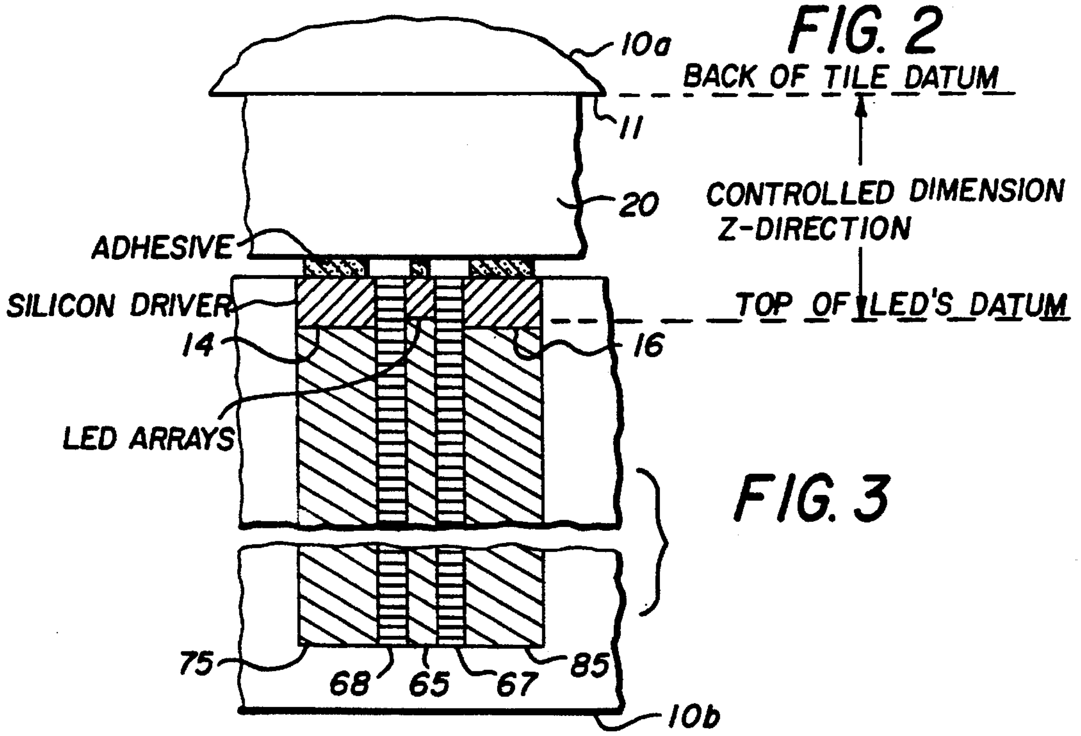
FIG. 3 is an enlarged view of the circled portion, C, of FIG. 1.
Figure 4:
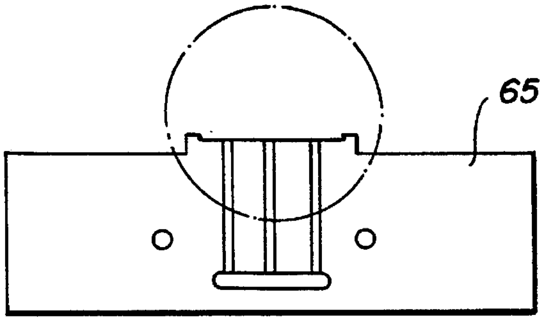
FIG. 4 is a view of a shim block for supporting LED's in the sub-assembly of FIG. 1.
Figure 5:
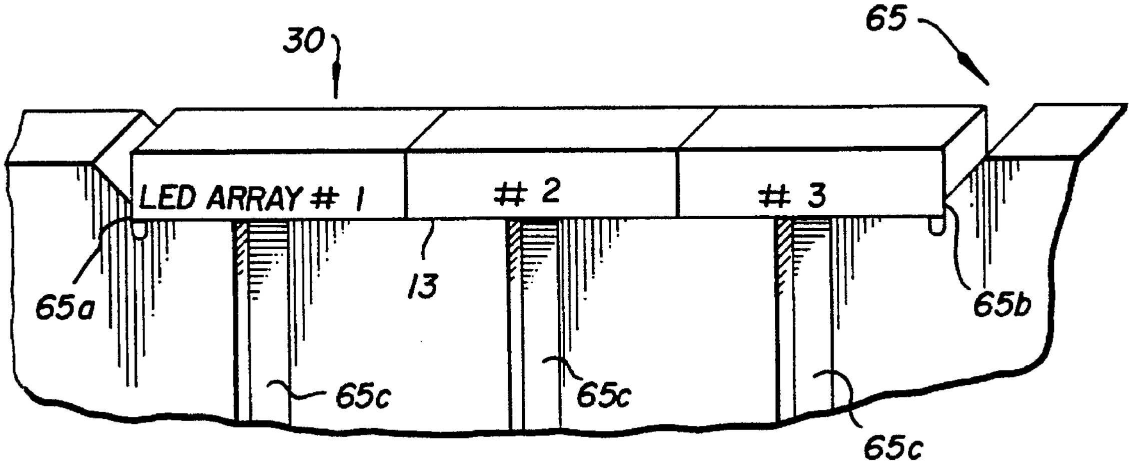
FIG. 5 is an enlarged view shown in perspective of the circled portion of FIG. 4.

As may be seen more clearly in FIGS. 3, 4 and 5, the bottom member 10*b* of the sub-assembly fixture 10 includes a shim block 65 having an accurately dimensioned pocket 13 or recess into which three LED dice 30 are placed end to end in abutting relationship with the first LED array abutting against a shoulder 65*a* formed on the shim block 65. Alternatively, LED arrays #1 and #3 are positioned to abutt against shoulders 65*a* and 65*b*, respectively, and LED array #2 is spaced an equal distance between the two other arrays. The bottom surface of the pocket 13 is accurately located relative to a surface 11 on a top member 10*a* of sub-assembly fixture 10 as will be further described below. Pockets 14 and 16 formed on shim blocks 75 and 85 are also provided for the rows of driver chips so that three silicon driver chips are located in each of two rows to one side of the row of LED dice. The driver chips and LED dice are mounted up-side down in the respective pockets. The height or depth of the bottom surface of each of the pockets for the driver chips are not as critical as that for the LED dice. In addition to providing shims 68 and 67 to separate shim blocks 75 and 85 from the LED shim block 65, additional transversely directed shims 72 may be provided and located between the driver chips so as to space the driver chips from each other. With the driver chips and LED dice accurately positioned face down in the lower fixture member lob, a tile 20 having areas thereof silkscreened with precise amounts of adhesive where the respective nine components are to be attached, is positioned onto the upper fixture member 10a. The tile 20 is located (shown in phantom in FIG. 2) using locating pins 50*a*, b and c formed on the under-surface 11 of top fixture member 10*a* and held in place by vacuum from a suitable conventional source, V. Additionally, the nine components are held in place by vacuum which is established within channels passing through the lower fixture member and respective shim blocks as will be discussed below.

Figure 6:
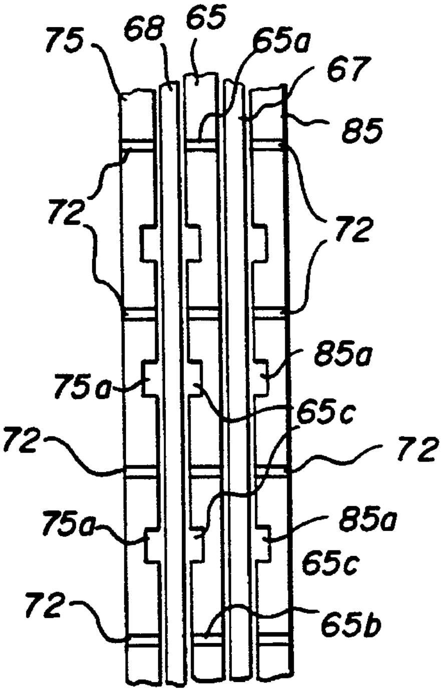
FIG. 6 is a plan view of the shim block assembly shown in FIG. 3.

With reference to FIGS. 5 and 6, vacuum channels are shown in shim block 65. Application of vacuum to the lower fixture assembly causes LED dice to be held onto the top surface of shim block 65 as well as urged against shim 68 which is between shim blocks 75 and 65. Shims 68, 72 and 67, as shown in FIG. 3, extend higher than the shim blocks and serve as locating surfaces 80 that when vacuum is applied to channels 75*a* in shim block 75, and to channels 65*c* in shim block 65, and 85*a* in shim block 85 the respective driver chips and LED dice are urged toward the respective adjacent shim wall as well as held down on their respective shim block to precisely locate these components.

After accurately locating the tile to the under-surface 11 of upper fixture member 10*a*, the upper fixture member 10*a* is guided into position over lower fixture member 10*b* using locating pins 60*a*, 60*b* which extend through respective apertures in fixture 10*a*. A surface 11 of the upper fixture member 10*a* is now supported a fixed distance from a facing surface of lower fixture member 10*b*. This distance is established by accurate bushings 70*a*, 70*b*. As the upper fixture member is moved towards the lower fixture member at a fixed position just before die and adhesive contact, the tile 20 is relocated by 3 locating pins 51*a*, b and c formed in the lower assembly. The tile is made to slide against the surface 11 of the upper fixture member 10*a* when being located against the 3 locating pins on the lower fixture member. Holes are provided in the upper fixture member 10*a* for receiving the pins 51*a*, b and c. The three locating pins 51*a*, b and c extending from the lower fixture member 10*b* are generally conical in shape and taper so that the narrow portion thereof is furthest from the lower fixture member. Thus, as the upper fixture assembly 10*a* approaches the lower fixture assembly lob, the tile 20 held by vacuum on the upper fixture assembly is cammed away from the pins 50*a*, b and c by the taper on the pins 51*a*, b and c and slides along surface 11 of the upper fixture assembly to be relocated against pins 51*a*, b and c.

The view in FIG. 2 shows the tile 20 after the subassembly operation causes the LED dice and driver chips to be adhesively attached to the tile. The vacuum holding of the LED dice and driver chips is shut off and the fixture halves separated. The dice and chips are held to the tile by the surface tension of the adhesive. The tile is then removed from the fixture.

There has thus been described an improved method and apparatus for assembling recording elements onto a tile plate to provide precise z-axis control between a datum on the tile and the emission surface of the recording elements supported on the tiles. Spreader boards may now be mounted to the tiles and wire bonds attached between the driver chips and LED dice and the driver chips and spreader boards. The tile is now a module that may be tested to check for defective components and burned in. The tiles may then be mounted directly onto the top surface of a heatsink without any adhesive between heatsink and tiles. Thus, if the Selfoc lens is also precisely mounted using the top surface of the heats ink as a datum, the z-axis dimensional control is maintained between the lens and LED emission surfaces.

A description of a printhead having a plurality of tiles mounted onto a heatsink without adhesive between the tiles and the heatsink is described in the cross-referenced application. In the printhead described in this cross-referenced application, leaf springs engage rail members attached to the under-surfaces of the tiles to urge the tile into engagement with the top surface of the heatsink. After the tile modules are mounted to the printhead, wire bonds may be made between the respective spreader boards to daisy-chain the electrical signals between the modules.

It will be appreciated by those skilled in the art that an improved method and apparatus is provided for assembling recording elements to a tile wherein tolerance variation is minimized and where no space constraints have been imposed on the front surface of the tile. The rear surfaces of the tiles can be located in coplanar relationship on a surface of the printhead and no loss of z-axis dimensional control occurs due to the presence of adhesive between the tiles and the heatsink.

Thus, in the invention described herein, the adhesive bond line between the recording element die and the tile compensates for the thickness variations of both the recording element die and the tile. The result is that the distance from the back surface of the tile to the front surface of the die is kept under tight dimensional control from part-to-part. The added benefit of coplanar surfaces required for the mounting of the back surfaces of the tiles makes for interfacing with other components much more straight forward and provides a low cost solution for compensation of the manufacturing tolerance accumulation of the tile and recording element dice.

While the invention has been described with reference to recording elements such as LED's, other recording elements such as laser diodes, ink jet, thermal, light valve, etc. may also make use of the teachings contained here in.

The invention has been described in detail with particular reference to preferred embodiments thereof, but it will be understood that variations and modifications can be effected within the spirit and scope of the invention.

What is claimed is:

1. A method for accurately assembling a recording element die onto a front face of a tile to provide accurate z-axis dimensional control of a front face of the die relative to a rear face on the tile, said method comprising the steps of:

accurately positioning the die in a fixture so that the front face of the die is located against a first datum on the fixture;

locating the rear face of the tile against a second datum on the fixture; and positioning the front face of the tile proximate to a rear face of the die with adhesive spacing the rear face of the die from the front face of the tile and with the second datum on the fixture located a fixed distance from the first datum to establish, for the die while assembled onto the tile, an accurate z-axis dimensional control of the front face of the die relative to the rear face of the tile, whereby the adhesive between the die and the front face of the tile compensates for thickness variations of both the die and the tile.

2. The method of claim 1 and including the step of supporting the rear face of the tile by vacuum and locating the tile against locating members formed on an upper fixture member of a fixture assembly and sliding said tile against tile locating members formed on a lower fixture member of the fixture assembly to precisely locate said tile with respect to said die.

3. The method of claim 2 and including the step of supporting a plurality of recording element dice and driver chips therefor on said lower fixture member.

4. An assembly fixture for accurately assembling a die incorporating a recording element onto a tile to provide accurate z-axis dimensional control of location of a front face of the die relative to a rear face on the tile, said fixture comprising:

first means for accurately positioning the die so that the front face of the die is located against a first datum on the fixture;

second means for locating the rear face of the tile against a second datum on the fixture; and third means for positioning a front face of the tile proximate to a rear face of the die with adhesive spacing the rear face of the die from the front surface of the tile and for accurately locating the second datum at a fixed distance from the first datum to establish, for the die while assembled onto the tile, an accurate z-axis dimensional control of the front face of the die relative to the rear face of the tile, whereby the adhesive between the die and the front face of the tile compensates for thickness variations of both the die and the tile.

5. The assembly fixture of claim 4 and wherein the fixture includes a first member having the first datum and a second member having the second datum and a bushing accurately spaces the first and second datums relative to each other.

6. The assembly fixture of claim 5 and wherein recesses are provided in the first member to support a series of recording element dice against the first datum.

7. The assembly fixture of claim 4 and including fourth means for accurately locating a front face of the tile in a plane parallel to an x, y plane of the recording element.

8. The assembly fixture of claim 7 and wherein the fourth means comprises a plurality of pins.

9. The assembly fixture of claim 8 and wherein the pins are tapered to cam the tile into position in the plane parallel to the x, y plane.

10. An apparatus for assembling recording element dice to a front face of a tile, said apparatus comprising:

a first fixture member having means for locating a back face of the tile and establishing a datum for said back face of the tile;

a second fixture member having means for establishing a datum for front faces of the dice; and means for accurately locating said first fixture member relative to said second fixture member with said front face of the tile proximate back faces of the dice with adhesive therebetween whereby said adhesive accommodates thickness variations in tiles and dies so that a substantially constant dimension is provided between the back surface of the tile and the front faces of the dice.

11. The apparatus of claim 10 and wherein cam means are provided for sliding the tile in a direction perpendicular to a direction established by the dimension between the back face of the tile and the front faces of the dice to locate the tile.

12. The apparatus of claim 11 and wherein said cam means includes a series of tapered pins.

13. The apparatus of claim 11 and wherein said series of tapered pins extends from said second fixture member and a series of pins extends from said first fixture member for locating said tile on said first fixture member.

14. A method for accurately assembling a plurality of recording element dice onto a front face of a tile to provide accurate z-axis dimensional control of front faces of the dice relative to a rear face on the tile, said method comprising the steps of:

accurately positioning the dice in a fixture so that the front faces of the dice are located against a first datum on the fixture;

locating the rear face of the tile against a second datum on the fixture; and positioning the front face of the tile proximate to rear faces of the dice with adhesive spacing the rear faces of the dice from the front face of the tile and with the second datum on the fixture located at a fixed distance from the first datum to establish, for the dice while assembled onto the tile, an accurate z-axis dimensional control of the front faces of the dice relative to the rear face of the tile, whereby the adhesive between the dice and the front face of the tile compensates for thickness variations of both the dice and the tile.

15. The method of claim 14 and including the step of supporting the rear face of the tile by vacuum and locating the tile against locating members formed on an upper fixture member of a fixture assembly and sliding said tile against tile locating members formed on a lower fixture member of the fixture assembly to precisely locate said tile with respect to said dice.

* * * * *